D. C. MULVIHILL.
CENTERING MECHANISM.
APPLICATION FILED JUNE 14, 1910.
1,044,071.
Patented Nov. 12, 1912.
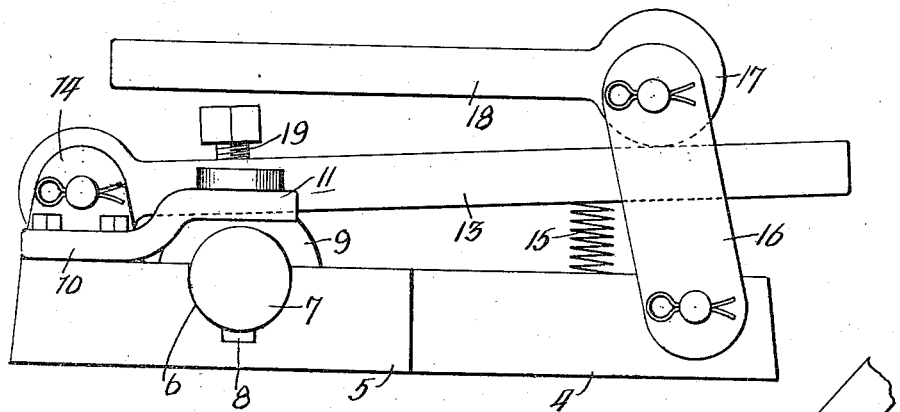
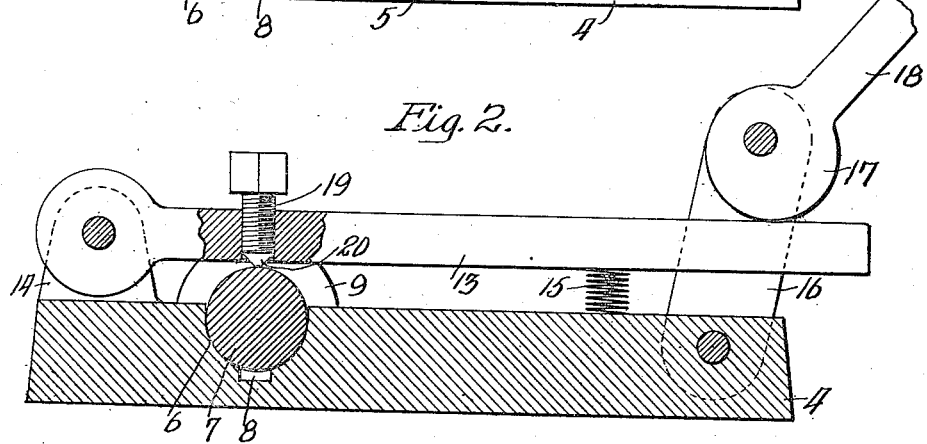
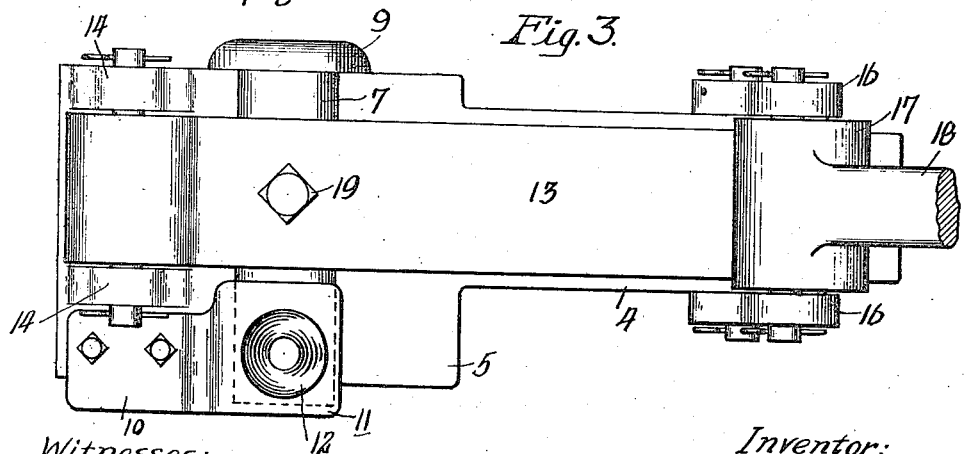
Witnesses:
Inventor:
Daniel C. Mulvihill.
BY
Attorneys.

UNITED STATES PATENT OFFICE.

DANIEL C. MULVIHILL, OF CHICAGO, ILLINOIS, ASSIGNOR TO AMERICAN CAR & FOUNDRY COMPANY, OF CHICAGO, ILLINOIS, A CORPORATION OF NEW JERSEY.

CENTERING MECHANISM.

1,044,071. Specification of Letters Patent. Patented Nov. 12, 1912.

Application filed June 14, 1910. Serial No. 566,932.

*To all whom it may concern:*

Be it known that I, DANIEL C. MULVIHILL, a citizen of the United States, residing at Chicago, in the county of Cook and State of Illinois, have invented certain new and useful Improvements in Centering Mechanisms, of which the following is a specification.

This mechanism relates to a device for centering and positioning work, so that a tool operating thereon will operate at the same point each time; and the objects of the present invention are to provide a base member which will serve to receive work and a guide member for the tool which will be positioned in desired correlation to a recess in the base member which receives the work, so that the tool entering through the guide member will be brought into desired operative relation with the work; and the invention further relates to means for centering the work with respect to the guide member, and to means for impinging and holding the work against movement during the operation of the tool thereon.

The invention further consists in the features of construction and combination of parts hereinafter described and claimed.

In the drawings—Figure 1 is a side elevation showing the arm for holding the work in position within the groove in the base member in raised or non-operative position; Fig. 2, a longitudinal sectional elevation showing the arm in lowered or operative position; and Fig. 3, a plan view.

The device comprises a base member 4, which is preferably enlarged at one end 5, and extending transversely across the enlarged portion 5 is a semi-cylindrical recess 6 adapted to receive the body of the work 7. The recess 6 terminates in a transversely extending groove 8, which provides a space below the work into which the end of the tool enters after passing through the work.
As shown more clearly in Fig. 3, the recess 6 is adapted to receive the body of the work 7, which lies transversely across the portion 5 of the base member, and the headed end of the work 9 will rest against the side of the portion 5 of the base member, thus centering the work and insuring the correct registration of the work with the tool.

Secured to one end of the portion 5 of the base member is a finger 10, which is offset to produce an overhanging portion 11, which overlies the recess 6 in the base member, and the overhanging portion 11 is formed with a funnel-shaped opening 12, the center of which is in alinement with the groove 8 in the base member. This funnel-shaped opening serves as a guide member for the tool, and since the opening is in line with a radius of the recess 6, and the work is centered with respect to said recess, it is obvious that when the work is inserted into the base member, and the tool inserted through the opening 12, the hole formed in the work by the passing of the tool therethrough will always be along a diameter of the work.

In order to prevent movement of the work during the passing of the tool therethrough, a horizontally extending swinging arm 13 is provided, which is pivoted between ears 14 formed with the base member, and is held normally upward by means of a spring 15 interposed between the top of the base member and the lower face of the arm.

Attached to the base member, at the opposite end to that to which the arm 13 is pivoted, are companion links 16, and between the upper ends of the link is secured a head 17 formed with a handle 18. As shown more clearly in Figs. 1 and 2, the head 17 is pivoted off center, so that when the handle is swung from the downward position shown in Fig. 1 to the upright position shown in Fig. 2 the head 17 will have its periphery forced toward the base member by reason of its eccentric mounting, and the periphery of the head will be in engagement with the upper surface of the arm 13; hence when the head is rotated the periphery thereof will act upon the upper surface of the arm 13 and force the arm downward, as shown in Fig. 2.

Screw-threaded into the arm 13, and positioned in substantial alinement with the groove 8, is a stem 19, having a tapered end 20. This stem serves to impinge against the work when the arm is lowered into the position shown in Fig. 2 and prevent a movement of the work while the tool is passing therethrough. The stem is made adjustable so that it can accommodate itself to work of various thicknesses.

The tool usually used in connection with this device is the ordinary drilling tool used with a drill press, but since the press and tool form no part of the present invention, and since the device is adapted to be used equally as well with other forms of tools, illustration and description of the tool and its method of operation are not deemed necessary at this time.

In centering the work, the operation is as follows: The work is inserted into the recess 6 until the headed end 9 is brought into engagement with the wall of the portion 5 of the base member 4. The handle 18 is then swung into the position shown in Fig. 2 and the head 17 will act to force the arm 13 downward, bringing the stem 19 into engagement with the work. The tool is then advanced to enter the funnel-shaped opening 12 and brought into engagement with the work; and after the completion of the operation of the tool upon the work the handle is thrown into the position shown in Fig. 1 and the stem 19 moved out of engagement with the work and the work withdrawn from the recess 6. In this manner a hole or other indentation or configuration adapted to be made upon the work can be accurately placed upon the work at the same point at each operation of the tool.

The movements necessary by the operator in order to properly center the work are extremely simple, the work being placed into the recess 6 with one hand and the handle 18 actuated with the other. Thus a continuous and quick feeding of the work into position to be operated upon by the tool is possible and the skill of the operator need not be depended upon to accurately position the work with respect to the tool, all of this being performed automatically by the centering device. The funnel-shaped opening 12 is provided so that the tool may be guided into the center of said opening without any undue strain thereon, such as would occur if it were to contact an abrupt shoulder and be forced violently into its proper position.

As shown in Fig. 2, when the handle is swung to bring the head into position to force the arm 13 downward and bring the stem 19 into engagement with the work, the handle will be lying at a plane to the rear of the pivotal center of the head, so that downward movement of the arm will tend to force the lever 18 downwardly and thus bring the acting edge of the head into firmer contact with the arm 13. Thus, when the arm 13 and head are in the position shown in Fig. 2, the arm 13 is firmly locked in its lowered position and movement out of such position can only be obtained by a swinging of the handle back into the position shown in Fig. 1, so that the periphery of the head will be drawn away from the base member, thus permitting the handle to rise by the action of the spring 15.

I claim:

1. In a centering device, the combination of a base member, adapted to receive the work, a clamping bar pivoted to the base member, a lever provided with a head adapted to engage said bar, a link pivotally secured to the base member and to the head, said head having an eccentric movement around its pivotal center, a movement of the lever to bring the head into clamping position throwing the upper end of the link to one side of the lower end and moving said upper end farther away from the pivotal center of the bar than the lower end, substantially as described.

2. In a centering device, the combination of a base member, a clamping bar pivoted to the base member, means for locking the bar in operative position, and an adjustable pointed member carried by the bar for engaging the work when the bar is moved to operative position, substantially as described.

D. C. MULVIHILL.

Witnesses:
Wm. P. Bond,
Mary R. Frost.